United States Patent [19]

Turecek

[11] Patent Number: 4,563,140
[45] Date of Patent: Jan. 7, 1986

[54] APPARATUS FOR COATING ALIGNED CORDS

[75] Inventor: Donald J. Turecek, North Branford, Conn.

[73] Assignee: Armstrong Rubber Company, New Haven, Conn.

[21] Appl. No.: 551,096

[22] Filed: Nov. 14, 1983

[51] Int. Cl.$^4$ ............................................. B29F 3/10
[52] U.S. Cl. .................... 425/114; 118/670; 118/DIG. 18; 425/131.1; 425/133.5; 425/461; 425/467
[58] Field of Search ............... 425/113, 114, 197, 198, 425/199, 382 R, 376, 466, 467, 131.1, 133.5, 461; 118/670, DIG. 18, DIG. 22

[56] References Cited

U.S. PATENT DOCUMENTS

| | | | |
|---|---|---|---|
| 3,263,271 | 8/1966 | Hannis | 425/114 |
| 3,737,262 | 6/1973 | Klein | 425/113 |
| 4,300,878 | 11/1981 | Ible | 425/467 |
| 4,308,823 | 1/1982 | Klein | 118/670 |
| 4,377,881 | 3/1983 | Bakewell et al. | 118/DIG. 18 |

Primary Examiner—Caleb Weston
Attorney, Agent, or Firm—St. Onge Steward Johnston & Reens

[57] ABSTRACT

The present invention provides an apparatus for continuously coating aligned cords having knots or other enlarged irregularities therein. A cord-alignment baffle means of novel construction located at the cord entrance of an extrusion coating die assembly enables passage of splices such as knots. The baffle means comprises a plurality of cord-alignment apertures, each of which comprises a guide position and an enlarged knot-passing position. During operation of the coating process, cords are maintained in alignment as they pass through the die, and intermittent knots pass through the enlarged knot-passing positions of the alignment apertures. A bleed means controls the pressure within the extrusion chamber to prevent undesirable backflow through the enlarged knot-passing positions of the alignment apertures.

16 Claims, 5 Drawing Figures

APPARATUS FOR COATING ALIGNED CORDS

TECHNICAL FIELD

The invention relates to an apparatus for coating aligned cords on a continuous basis, and more particularly to an apparatus of this type which permits cords having knots therein to be passed through a coating die assembly.

The efficient preparation of reinforcement strips containing a plurality of aligned cords embedded in a coating material is of particular importance in the manufacture of tires. These strips are employed in the preparation of reinforcements, the most effective of which are endless belts woven from one or more of these strips. The endless belts are placed on a tire carcass and then overlayed with tread-forming stock.

Ideally, the strips are prepared continuously and used continuously in the preparation of the belts. The cord for preparing the reinforcement strips is supplied from spools containing finite lengths of cord. When an individual spool for one of the plurality of cords reaches the end, the continuity of the coating process and the belt weaving process depends upon the ability to splice the end of the cord from that spool to the beginning of a new spool and run the spliced cords through the coating process without interruption.

Unfortunately, when employing most tire cord materials, splices cannot be made without creating enlarged areas, such as knots, sewn areas of double (or greater) thickness, lap-glued joints, or the like. When these enlarged areas reach the entrance end of the coating die assembly, they can cause stoppage of the coating process—or the whole belt forming process, if the coating is interrupted too long.

Depending upon the size of the tire, the weaving of the endless belt may require up to a mile or more of reinforcement strip material, with each of the strips containing a plurality of cords. The number of stoppages, of course, increases with the number of cords employed in the strip, and the continuous production of reinforcement belts is seriously affected in addition to being made more costly in terms of labor, equipment down time, and wasted materials.

BACKGROUND ART

The development of tire constructions which include an annular reinforcement belt, or breaker, about the periphery of the tire between the tread and the carcass has provided tires with better road stability and longer tread life in both radial and bias ply constructions. According to a preferred type of construction, shown for example in U.S. Pat. Nos. 3,720,569, 3,720,570, 3,729,365 and 3,770,042, one or more reinforcement strips are zig-zagged about a drum until a continuous reinforcement belt is woven. Each of the reinforcement strips is formed of a plurality of tire cords of suitable reinforcement material embedded in a coating material as described, for example, in U.S. Pat. No. 3,737,262. Unfortunately, as described above, the presence of knots or other enlargements in the tire cord cause interruptions in the process with too great a frequency.

In U.S. Pat. No. 4,308,823, Klein discloses an apparatus which is said to permit the improved coating of cords which have knots or other enlargements in them. According to that disclosure, an apparatus is suggested which detects the presence of knots and then causes an increase in the effective size of the entrance into the coating chamber responsive to the presence of the knots. The disclosed apparatus is, however, quite complicated mechanically, making it expensive to construct and maintain.

There is a present need for an apparatus of simplified construction which will permit the passage of cord having knots or other enlargements into an extrusion coating chamber.

DISCLOSURE OF THE INVENTION

In accordance with the present invention, I provide an improved cord-alignment baffle means for use in association with an extrusion die assembly for applying a coating of rubber or other coating material onto a plurality of spaced cords and an improved extrusion die assembly including the improved cord-alignment baffle means.

The cord-alignment baffle means of the invention comprises a solid support plate having plurality of cord-alignment apertures extending therethrough along parallel axes, wherein each of said apertures comprises a guide position and an enlarged knot-passing position. Preferably, the guide positions of each of the plurality of apertures are spaced equidistantly along the support plate. In the most preferred arrangement, the guide positions are formed as circular bores, with the centers of each bore being equidistantly positioned along a line perpendicular to the axes of the apertures. The knot-passing position of each of the apertures in this embodiment will be formed as circular bores of greater diameter than those of the guide positions, preferably staggered on opposite sides and said line, which intersect the circular bores of the guide positions at points thereon approximately defining diameters thereof.

The improved extrusion die assembly of the invention comprises: housing means comprising an extrusion chamber for applying a coating of rubber or other suitable coating material onto a plurality of spaced cords, and having a cord entrance position, a cord exit position, a coating material feed means, and a coating material bleed means; die means located at the cord exit position; and cord-alignment baffle means as defined above. According to a preferred embodiment of the invention, the extrusion die assembly further comprises means for adjusting the rate of discharge of coating material from the bleed means.

BRIEF DESCRIPTION OF THE DRAWINGS

The invention will be better understood and its advantages will become more apparent when the following detailed description is read in light of the accompanying drawings, wherein.

BEST MODE FOR CARRYING OUT THE INVENTION

Figure 1:
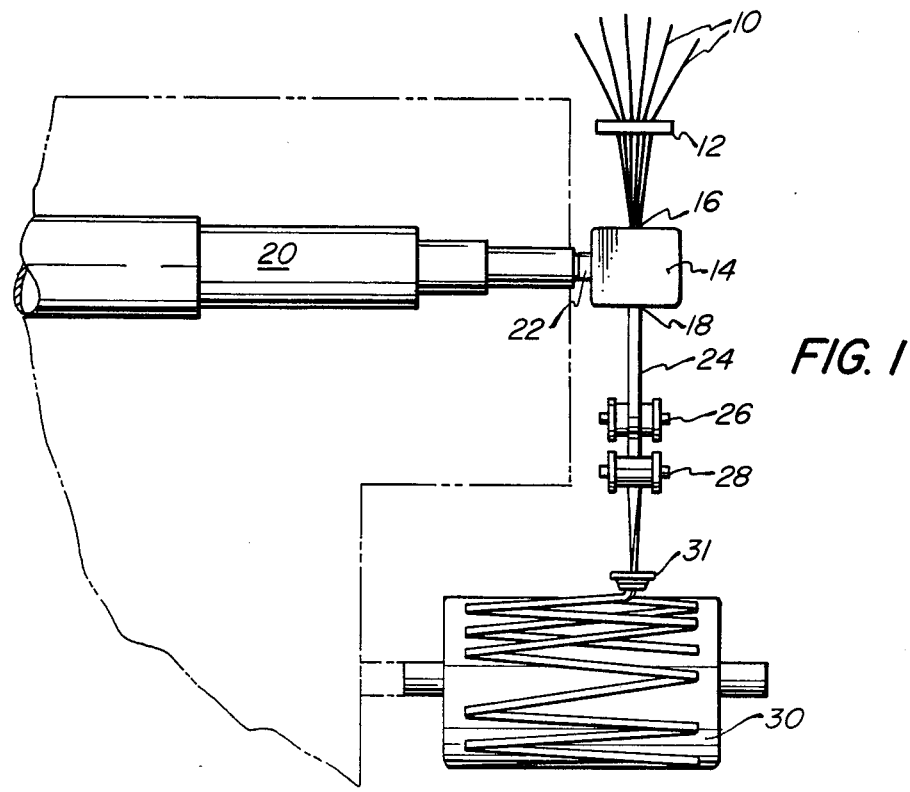
FIG. 1 is a schematic representation of the extrusion die assembly employing the cord-alignment baffle means of the invention in cooperation with means for feeding reinforcement cord to the die assembly, an extruder for supplying coating material to the die assembly, rollers for drawing a reinforcement strip from the die assembly, and a drum on which the reinforcement strip is applied in zig-zag fashion to form an endless reinforcement belt.

FIG. 1 of the drawings shows the overall interrelationship of the improved die assembly and the cord-alignment baffle means of the invention with the other apparatus typically employed in forming reinforcement strips and then using them to prepare an endless reinforcement belt. A plurality of individual tire reinforcement cords 10 (which when spliced during continuous operation, have intermittent enlarged areas) are shown guided through a cord guide means 12 toward an extrusion die assembly 14. The cords enter the die assembly at a cord entrance position 16 for coating within the die assembly 14 prior to exiting the assembly at cord exit position 18. An extruder 20 continuously feeds rubber or other suitable coating material into the extrusion die assembly 14 through a coating material feed means, the position of which is indicated by reference numeral 22. Not shown in this drawing is a coating material bleed means which permits the preferential escape of coating material therethrough to prevent backflow of coating material at the cord entrance position. Reinforcement strip 24, which comprises a plurality of aligned reinforcement cords 10 embedded within the coating material, is fed from the cord exit position 18 by rollers 26 and 28 to a rotating drum 30 where it is guided about the drum by means 31 which reciprocates axially to the drum.

Figure 2:
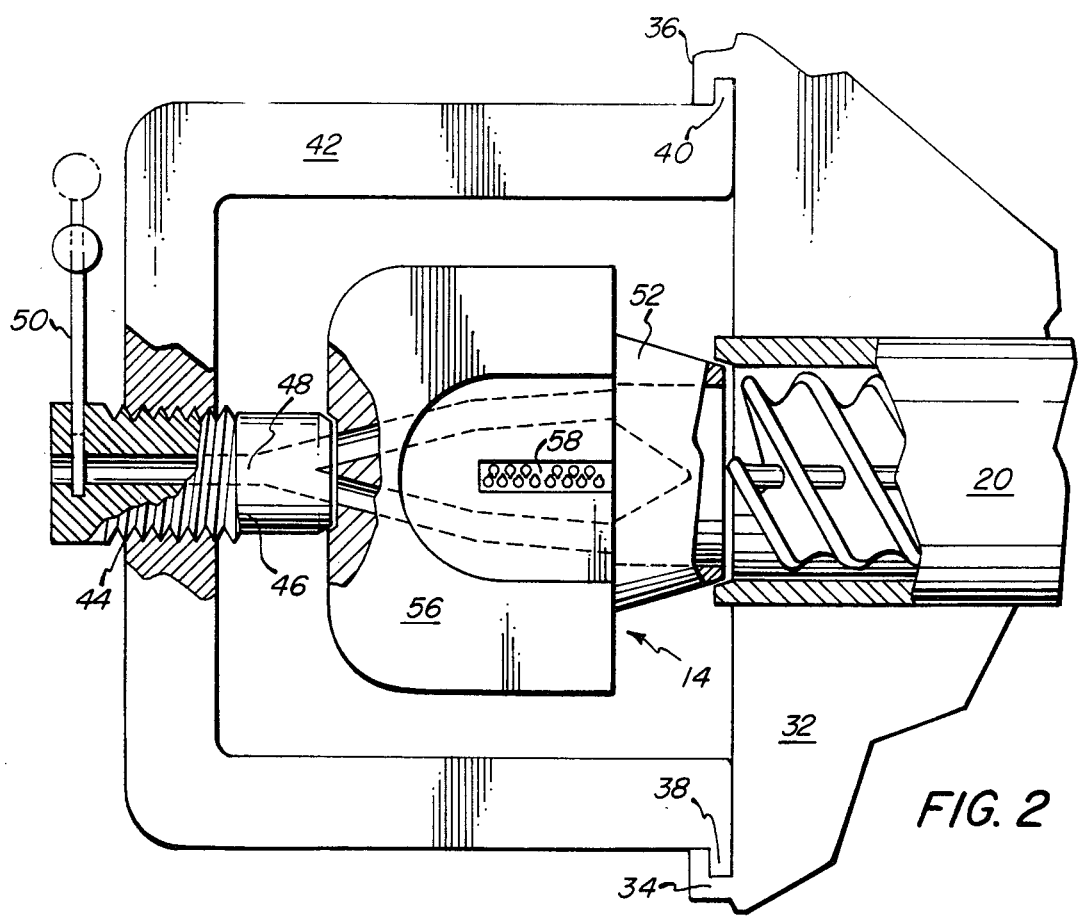
FIG. 2 is a front elevation, partially in section, showing the die assembly of the present invention in operative position.

The details of the extrusion die assembly 14 in operable relationship with extruder 20 are seen in FIG. 2. A support 32, which may be in common with the support for the extruder 20, is shown as having L-shaped guide members 34 and 36 which provide elongated grooves which engage slide members 38 and 40 at the base of C-shaped clamp member 42. Centrally located within the central portion of the clamp member 42 is a threaded bore 44 which receives a threaded retainer 46 having a passage 48 extending therethrough. As will be described later, the passage 48 communicates with coating material bleed means within the die assembly 14. Lever 50 is associated with retainer 46 and the passage 48 therethrough, to thereby comprise a means for adjusting the rate of discharge of coating material from the bleed means.

Figure 3:
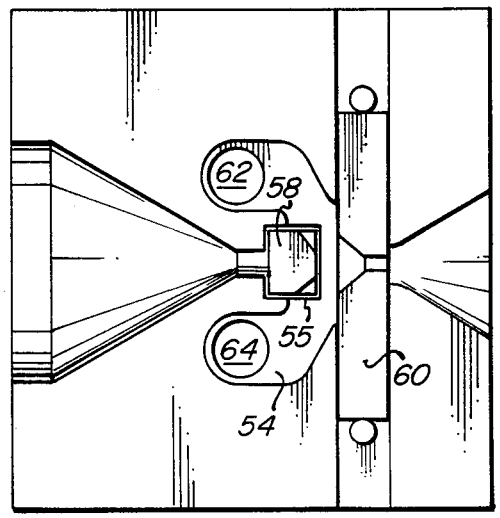
FIG. 3 is a side elevation view of the housing means of the die assembly showing the positioning of the cord-alignment baffle means therein.

On the opposite side of the die assembly 14 from the retainer 46 there is positioned an injection guide means 52 which provides communication between the extruder 20 and the extrusion chamber 54 (best seen in FIG. 3). The retainer 46 is shown in FIG. 2 to be extended in the direction forcing secure positioning of the housing means 56 with the injection guide means 52 and the extruder 20.

The detail of the housing means 56 and its relationship to the cord-alignment baffle means 58 is best shown in FIG. 3. The housing means 56 comprises an extrusion chamber 54 for applying a coating of rubber or other coating material into a plurality of spaced cords which are fed from a cord entrance position 60 through the cord-alignment baffle means 58 into the chamber 54 and then through a die means 60 located at the cord exit position 18. In operation, a plurality of reinforcement cords are fed through the cord-alignment baffle means from the left hand side of the drawing through the chamber 54 and the die 60 at rates of several hundred feed per minute. The extruder 20 will supply rubber or other coating material to the extrusion chamber 54 at high pressure. The pressure within the chamber is moderated by permitting a portion of the coating material entering the chamber 54 to exit through coating material bleed means which are shown comprised of channels 62 and 64 on opposite sides of the cord-alignment baffle means.

The die assembly preferably includes means for adjusting the rate of discharge of coating material from the bleed means. FIG. 1 snows a lever 50 which is operatively engaged wih retainer 46 and passage 48 therethrough to enable varying the size of the discharge opening from passage 48 between its fully-open and fully-closed positions.

The cord-alignment baffle means 58 according to the invention is preferably a removable member which can be slidably engaged into position within the housing means 56 as shown in FIG. 3. Enlarged butt end 66 secures the baffle means 54 in position when received within a complementarily shaped seat 55 within the housing means 56. The cord-alignment baffle means of the invention is shown to comprise a solid support plate having a plurality of cord-alignment apertures 68 extending therethrough along parallel axes. Each of the apertures 68 comprises a guide position 70 which is dimensioned effectively to pass the desired diameter of reinforcement cord. During normal operation, the individual reinforcement cords are guided at the plurality of guide positions 70 into the chamber 54. The cord-alignment apertures 68 each further comprise an enlarged knot-passing position 72 through which knots or other enlargements in the reinforcement cord are passed into the chamber 54 without interruption of the strip-forming process.

The cord-alignment apertures may have any suitable overall shape so long as they provide accurate guide means during normal operation and passage of knots or other enlargements as they occur, without providing such excessively large openings that the pressure within the extrusion chamber 54 cannot be adequately relieved by the bleed means. An advantage of the present invention is that knots or other enlargements can be easily passed through the extrusion chamber 54 without causing backflow of rubber through the alignment apertures to any detrimental extent. Typically, the shape of the alignment apertures can be defined as "keyhole" or "pear-shaped". The cord-alignment and knot-passing positions can have circular or other suitable shapes. The apertures are conveniently formed by machining, as by boring, a first array of aligned circular holes having diameters effective to pass the desired diameter of cord and then machining, for each of the holes in the first array, an intersecting hole of a larger diameter (and cross-sectional areas), effective to pass a splices, such as a knot, a lap glued or sewn splice, or other enlargement, in the cord of selected diameter. The centers of each pair of intersecting holes are preferably separated sufficiently such that the second larger hole intersects the smaller hole at points on the smaller hole approximately defining its diameter. In feeding the cords to the alignment apertures, the individual cords are preferably biased toward the cord-alignment positions 70 by feeding them at a slight angle to the axes of the apertures.

Figure 4:
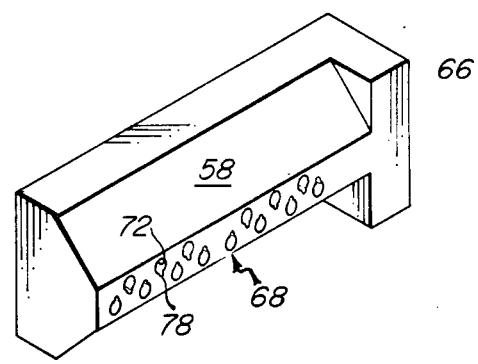
FIG. 4 is a perspective view showing the cord-alignment baffle means of the invention.
Figure 5:
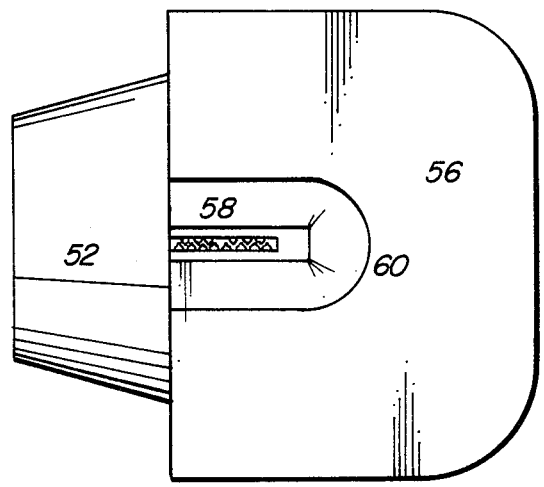
FIG. 5 is a rear elevation of the die assembly of the invention.

In the particular embodiment shown in FIG. 5, the die is designed to embed a total of 14 reenforcement cords within the coating material. According to the preferred method, strips of this configuration are split centrally of their length into two reinforcing strips, each of which contains seven reinforcement cords. The front elevation view of FIG. 5 shows that the guide positions 70 of each of the plurality of apertures 68 (for each of the two reinforcement strips to be formed) are spaced equidistantly along the support plate. In the preferred arrangement shown in FIGS. 4 and 5, the guide positions 70 are formed as circular bores, with the centers of each bore being positioned along a line perpendicular to the axes of the apertures. The knot-passing positions 72 of the apertures 68 in this embodiment are formed as circular bores of greater diameter than those of the guide positions 70. The knot-passing positions 72 are shown to be staggered on opposite sides of a line passing through the centers of the circular bores defining the guide positions 70.

The above description is for the purpose of teaching the person skilled in the art how to make and use the invention and is not intended to describe in detail all of the obvious modifications and variations of the invention which will become apparent to the skilled worker upon reading the description. It is intended, however, that all such obvious modifications and variations be included within the scope of the invention which is defined by the following claims.

I claim:

1. A cord-alignment baffle means for use in association with an extrusion die assembly for applying a coating onto a plurality of spaced cords comprising:
    a solid support plate having a plurality of cord-alignment apertures extending therethrough along parallel axes, wherein each of said apertures comprises a guide position and an enlarged knot-passing position.

2. A cord-alignment baffle means according to claim 1 wherein said guide positions of each of the plurality of apertures for forming an individual reinforcement strip containing a plurality of cords are spaced equidistantly along the support plate.

3. A cord-alignment baffle means according to claim 1 wherein said guide positions are formed as circular bores within said support plate, with the centers of each of said bores being positioned along a line perpendicular to the axes of said apertures.

4. A cord-alignment baffle means according to claim 3 wherein said knot-passing positions of said apertures are formed as circular bores of greater diameter than those of said guide positions.

5. A cord-alignment baffle means according to claim 4 wherein said circular bores forming said knot-passing positions of said apertures are staggered on opposite sides of said line.

6. A cord-alignment baffle means according to claim 4 wherein said circular bores forming said knot-passing positions of said apertures intersect said circular bores forming said guide positions at points thereon approximately defining diameters thereof.

7. An extrusion die assembly adapted to apply a coating onto a plurality of spaced cords having intermittent enlarged areas, comprising;
    housing means comprising an extrusion chamber for applying a coating material onto a plurality of spaced cords and having a cord entrance position, a cord exit position, a coating material feed means, and a coating material bleed means;
    die means located at the cord exit position; and
    cord-alignment baffle means located at the cord entrance position and comprising a plurality of cord-alignment apertures, each of which comprises a guide position and an enlarged knot-passing position.

8. An extrusion die assembly according to claim 7 which further comprises means for adjusting the rate of discharge of coating material from said bleed means.

9. An extrusion die assembly according to claim 7 wherein said guide positions of each of the plurality of apertures for forming an individual reinforcement strip containing a plurality of cords are spaced equidistantly along the support plate.

10. An extrusion die assembly according to claim 7 wherein said guide positions are formed as circular bores within said support plate, with the centers of each of said bores being positioned along a line perpendicular to the axes of said apertures.

11. An extrusion die assembly according to claim 10 wherein said knot-passing positions of said apertures are formed as circular bores of greater diameter than those of said guide positions.

12. An extrusion die assembly according to claim 11 wherein said circular bores forming said knot-passing positions of said apertures are staggered on opposite sides of said line.

13. An extrusion die assembly according to claim 10 wherein said circular bores forming said knot-passing positions of said apertures intersect said circular bores forming said guide positions at points thereon approximately defining diameters thereof.

14. A rubber extrusion die assembly adapted to form a tire reinforcement strip by applying a coating of rubber onto a plurality of spaced cords having intermittent enlarged splice areas, comprising:
    an extrusion chamber, for applying a coating of rubber onto a plurality of spaced cords, which is in communication with a reinforcement cord entrance, a reinforcement cord exit, a rubber feed means, and a rubber bleed means, including means to adjust the rate of discharge therefrom;
    die means located at the cord exit; and
    cord-alignment baffle means located at the cord entrance and comprising a plurality of cord-alignment apertures, each of which comprises a guide position and an enlarged knot-passing position, wherein said guide positions are formed as bores within said support plate, with the centers of each of said bores being positioned along a line perpendicular to the axes of said apertures, and wherein said knot-pass positions of said apertures are formed as bores of greater cross-sectional area than those of said guide portions.

15. A rubber extrusion die assembly according to claim 14 wherein said bores forming said knot-passing positions of said apertures are staggered on opposite sides of said line.

16. A rubber extrusion die assembly according to claim 15 wherein said guide positions of each of the plurality of apertures for forming an individual reinforcement strip containing a plurality of cords are spaced equidistantly along the support plate.

* * * * *

UNITED STATES PATENT AND TRADEMARK OFFICE
CERTIFICATE OF CORRECTION

PATENT NO. : 4,563,140
DATED : January 7, 1986
INVENTOR(S) : Donald J. Turecek

It is certified that error appears in the above-identified patent and that said Letters Patent are hereby corrected as shown below:

On Sheet 2, Fig. 4, the number "78" should be -- 70 --.

In Column 3, line 63, the number "60" should be --16 --.

In Column 4, line 12, "FIG. 1" should read -- FIG 2 --, and the word "snows" should be -- shows --.

In Column 4, line 21, the number "54" should be -- 58 --.

In Column 4, line 56, the word "splices" should be changed to -- splice --.

Signed and Sealed this

Fifteenth Day of July 1986

[SEAL]

Attest:

DONALD J. QUIGG

Attesting Officer

Commissioner of Patents and Trademarks